(12) United States Patent
Wei

(10) Patent No.: US 10,356,598 B2
(45) Date of Patent: Jul. 16, 2019

(54) MOBILITY MANAGEMENT METHOD, APPARATUS, AND SYSTEM

(71) Applicant: Huawei Technologies Co., Ltd., Shenzhen, Guangdong (CN)

(72) Inventor: Xinpeng Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 15/675,047

(22) Filed: Aug. 11, 2017

(65) Prior Publication Data

US 2017/0339551 A1 Nov. 23, 2017

Related U.S. Application Data

(63) Continuation of application No. PCT/CN2015/072965, filed on Feb. 13, 2015.

(51) Int. Cl.
*H04W 24/02* (2009.01)
*H04W 8/08* (2009.01)
(Continued)

(52) U.S. Cl.
CPC ............ *H04W 8/08* (2013.01); *H04W 8/12* (2013.01); *H04W 36/0005* (2013.01);
(Continued)

(58) Field of Classification Search
CPC ... H04W 8/08; H04W 60/04; H04W 36/0005; H04W 8/12; H04W 24/02; H04W 8/26
See application file for complete search history.

(56) References Cited

U.S. PATENT DOCUMENTS

2008/0256220 A1* 10/2008 Bachmann .............. H04W 8/04
709/222
2008/0291885 A1 11/2008 Miao et al.
(Continued)

FOREIGN PATENT DOCUMENTS

CN 101001261 A 7/2007
CN 101188542 A 5/2008
(Continued)

OTHER PUBLICATIONS

Perkins et al.; "Mobility Support in IPv6"; Internet Engineering Task Force (IETF); RFC 6275; Standards Track; Jul. 2011; 169 pages.
(Continued)

*Primary Examiner* — Jay P Patel

(57) ABSTRACT

Embodiments of the present disclosure provide a mobility management method, apparatus, and system. An HA-C sends a first BA message to an MN, where the first BA message includes an address of a first HA-U; and the HA-C sends a configuration message to the first HA-U, where the configuration message includes an HoA and a CoA that are of the MN, so that the first HA-U performs tunnel communication with the MN according to the configuration message. In this way, an original proxy server or an original gateway completes only tunnel communication with the MN, and a newly-added proxy server completes control signaling interaction with a BU, thereby reducing load of the original proxy server or the original gateway, and resolving a prior-art problem that load of a proxy server or a gateway is relatively heavy.

19 Claims, 6 Drawing Sheets

(51) Int. Cl.
*H04W 8/12* (2009.01)
*H04W 36/00* (2009.01)
*H04W 60/04* (2009.01)
*H04W 8/26* (2009.01)

(52) U.S. Cl.
CPC .............. *H04W 60/04* (2013.01); *H04W 8/26* (2013.01); *H04W 24/02* (2013.01)

(56) References Cited

U.S. PATENT DOCUMENTS

| | | | |
|---|---|---|---|
| 2009/0073995 A1* | 3/2009 | Pandey | H04L 12/4633 370/401 |
| 2009/0086625 A1* | 4/2009 | Nandagopal | H04L 29/12301 370/227 |
| 2010/0118832 A1* | 5/2010 | Grinshpun | H04W 76/38 370/331 |
| 2010/0195500 A1 | 8/2010 | Sejimo | |
| 2010/0322083 A1 | 12/2010 | Qiang | |
| 2011/0090868 A1 | 4/2011 | Zhang et al. | |
| 2011/0149873 A1* | 6/2011 | Yao | H04W 60/00 370/328 |
| 2012/0294189 A1* | 11/2012 | Sarikaya | H04W 60/005 370/254 |
| 2015/0148036 A1* | 5/2015 | Grayson | H04W 8/06 455/435.1 |
| 2016/0037328 A1* | 2/2016 | Raveendran | H04W 8/08 370/328 |

FOREIGN PATENT DOCUMENTS

| | | |
|---|---|---|
| CN | 101621785 A | 1/2010 |
| CN | 101902725 A | 12/2010 |
| EP | 1883196 A1 | 1/2008 |
| WO | 2009116321 A1 | 9/2009 |

OTHER PUBLICATIONS

H. Soliman; "Mobile IPv6 Support for Dual Stack Hosts and Routers"; Internet Engineering Task Force (IETF) Network Working Group; RFC 5555; Standards Track; Jun. 2009; 41 pages.

Yokota et al.; "Use case scenarios for Distributed Mobility Management"; IETF; Network Working Group Internet-Draft; Oct. 18, 2010; 18 pages.

Wakikawa et al. "Requirements and use cases for separating control and user planes in mobile network architectures"; IETF; Int Area Internet-Draft; Nov. 7, 2013; 11 pages.

Sarikaya. B.; "Mobility Management Protocols for Cloud-Like Architectures"; IETF; Network Working Group Internet—Draft; Oct. 15, 2012; 11 pages.

Wakikawa et al. "Separation of Control and User Plane for Proxy Mobile IPv6"; IETF; RFC 7389; Oct. 31, 2014; 12 pages.

B.Sarikaya, "Mobility Management Protocols for Cloud-Like Architectures, draft-sarikaya-dmm-cloud-mm-00.txt," Huawei USA, Network Working Group, Internet-Draft, Oct. 15, 2012, 11 pages.

C. Perkins, "Alternate Tunnel Source Address for LMA and Home Agent, draft-perkins-netext-hatunaddr-00.txt," Futurewei Inc., Network-Based Mobility Extensions, Internet-Draft, May 2012, 10 pages.

* cited by examiner

MOBILITY MANAGEMENT METHOD, APPARATUS, AND SYSTEM

CROSS-REFERENCE TO RELATED APPLICATIONS

This application is a continuation of International Application No. PCT/CN2015/072965, filed on Feb. 13, 2015, the disclosure of which is hereby incorporated by reference in its entirety.

TECHNICAL FIELD

Embodiments of the present application relate to communications technologies, and in particular, to a mobility management method, apparatus, and system.

BACKGROUND

With gradual convergence of the Internet and mobile communication, an increasing quantity of people access the Internet at anytime and anywhere by using a mobile node (for example, a cell phone).

In the prior art, when a mobile node (MN) initially accesses a first network, the MN obtains a home address (HoA) allocated by a home agent (HA) in the first network to the MN. The MN communicates with a correspondent node (CN) by using the HoA. When the MN moves to a second network, the MN obtains a care-of address (CoA) allocated by the second network to the MN. Then, the MN sends the HoA and the CoA to the HA by using a binding update (BU) message; and the HA creates a binding cache entry (BCE) for the MN, and returns a binding acknowledgement (BA) message to the MN. To avoid a problem that communication between the MN and the CN is interrupted because the MN moves to the second network, when the CN sends a data packet (the data packet includes the HoA of the MN) to the MN, the data packet is routed to a link of the first network of the MN and then is intercepted by the HA. The HA transmits the data packet to the MN by means of tunnel communication (a destination address of tunnel encapsulation is the CoA of the MN). Similarly, when the MN needs to send a data packet to the CN, the MN performs tunnel encapsulation on the data packet and sends an encapsulated data packet to the HA. The HA performs tunnel decapsulation on the encapsulated data packet after receiving the data packet on which tunnel encapsulation is performed, and then forwards a decapsulated data packet to the CN.

However, in the prior art, because the HA is deployed on a proxy server or a gateway (for example, a packet data network gateway (PGW)), load of the proxy server or the gateway is relatively heavy.

SUMMARY

Embodiments of the present disclosure provide a mobility management method, apparatus, and system, so as to resolve a prior-art problem that load of a proxy server or a gateway is relatively heavy.

According to a first aspect, the present disclosure provides a mobility management method, applied to a communications system, where the communications system includes a home agent control plane HA-C, a first home agent user plane HA-U, and a mobile node MN; the first HA-U is located in a first network, the first HA-U is deployed on a first proxy server or a gateway, and the HA-C is deployed on a second proxy server; and the method includes:

receiving, by the HA-C, a first binding update BU message sent by the MN when the MN accesses the first network;

sending, by the HA-C, a first binding acknowledgement BA message to the MN according to the first BU message, where the first BA message includes an address of the first HA-U, so that the MN performs tunnel communication with the first HA-U according to the address of the first HA-U after the MN moves from the first network to a second network;

receiving, by the HA-C, a second BU message sent by the MN after the MN moves from the first network to the second network, where the second BU message includes a home address HoA and a care-of address CoA that are of the MN; and sending, by the HA-C, a configuration message to the first HA-U, where the configuration message includes the HoA and the CoA that are of the MN, so that the first HA-U performs tunnel communication with the MN according to the configuration message.

With reference to the first aspect, in a first possible implementation of the first aspect, if the first network includes at least two HA-Us, and the at least two HA-Us are separately deployed on different proxy servers or different gateways, before the sending, by the HA-C, a first BA message to the MN, the method further includes:

determining, by the HA-C according to a load balance rule, the first HA-U from the at least two HA-Us included in the first network.

With reference to the first possible implementation of the first aspect, in a second possible implementation of the first aspect, the determining, by the HA-C according to a load balance rule, the first HA-U from the at least two HA-Us included in the first network includes:

determining, by the HA-C, an HA-U with minimum load in the at least two HA-Us included in the first network as the first HA-U.

With reference to the first or the second possible implementation of the first aspect, in a third possible implementation of the first aspect, the first BU message includes the HoA of the MN, and after the determining, by the HA-C according to a load balance rule, the first HA-U from the at least two HA-Us included in the first network, the method further includes:

creating, by the HA-C, a binding cache entry BCE for the MN, where the BCE includes the address of the first HA-U and the HoA; and after the receiving, by the HA-C, a second BU message sent by the MN after the MN moves from the first network to the second network, the method further includes:

updating, by the HA-C, the BCE according to the CoA of the MN included in the second BU message, to obtain an updated BCE, where the updated BCE includes the address of the first HA-U, the HoA, and the CoA.

With reference to any one of the first aspect, or the first to the third possible implementations of the first aspect, in a fourth possible implementation of the first aspect, the communications system further includes a second HA-U, and the second HA-U is located in the second network; and after the receiving, by the HA-C, a second BU message sent by the MN after the MN moves from the first network to the second network, the method further includes:

determining, by the HA-C, that an HA-U of the MN includes the second HA-U located in the second network; and sending, by the HA-C, a second BA message to the MN, where the second BA message includes an address of the second HA-U, so that the MN performs tunnel communication with the second HA-U according to the address of the second HA-U after the MN moves from the second network to a third network different from the second network.

With reference to the fourth possible implementation of the first aspect, in a fifth possible implementation of the first aspect, if the second network includes at least two HA-Us, and the at least two HA-Us are separately deployed on different proxy servers or different gateways, the determining, by the HA-C, that an HA-U of the MN includes the second HA-U located in the second network includes:

determining, by the HA-C, the HA-U of the MN includes an HA-U located in the second network; and determining, by the HA-C according to the load balance rule from the at least two HA-Us included in the second network, that the HA-U that is in the second network and that is of the MN is the second HA-U.

With reference to any one of the first aspect, or the first to the fifth possible implementations of the first aspect, in a sixth possible implementation of the first aspect, the configuration message further includes a tunnel type, and the tunnel type is used to indicate a tunnel protocol used when tunnel communication is performed; and the first BA message further includes the tunnel type.

With reference to the sixth possible implementation of the first aspect, in a seventh possible implementation of the first aspect, the configuration message further includes a tunnel parameter, and the tunnel parameter is a related parameter used when tunnel communication is performed by using the tunnel protocol indicated by the tunnel type; and the first BA message further includes the tunnel parameter.

With reference to any one of the first aspect, or the first to the seventh possible implementations of the first aspect, in an eighth possible implementation of the first aspect, after the receiving, by the HA-C, a second BU message sent by the MN, the method further includes:

receiving, by the HA-C, a mobile prefix solicitation MPS message sent by the MN, and returning a mobile prefix advertisement MPA message to the MN.

With reference to any one of the first aspect, or the first to the eighth possible implementations of the first aspect, in a ninth possible implementation of the first aspect, the communications system further includes a correspondent node CN, and the CN communicates with the MN by using the first network; and after the receiving, by the HA-C, a second BU message sent by the MN, the method further includes:

receiving, by the HA-C, a home test initialization HTI message sent by the MN, and forwarding the HTI message to the CN.

According to a second aspect, the present disclosure provides a mobility management method, applied to a communications system, where the communications system includes a home agent control plane HA-C, a first home agent user plane HA-U, and a mobile node MN; the first HA-U is located in a first network, the first HA-U is deployed on a first proxy server or a gateway, and the HA-C is deployed on a second proxy server; and the method includes:

receiving, by the first HA-U, a configuration message sent by the HA-C, where the configuration message includes a home address HoA and a care-of address CoA that are of the MN; and performing, by the first HA-U, tunnel communication with the MN according to the configuration message.

With reference to the first possible implementation of the second aspect, in a second possible implementation of the second aspect, the communications system further includes a correspondent node CN, and the CN communicates with the MN by using the first network; and the performing, by the first HA-U, tunnel communication with the MN according to the configuration message includes:

receiving, by the first HA-U, a first data packet sent by the MN, where the first data packet is a data packet obtained after the MN performs tunnel encapsulation on a second data packet according to an address of the first HA-U, and the second data packet is a data packet sent by the MN to the CN; and performing, by the first HA-U, tunnel decapsulation on the first data packet to obtain the second data packet, and forwarding the second data packet to the CN.

With reference to the first possible implementation of the second aspect, in a second possible implementation of the second aspect, the performing, by the first HA-U, tunnel communication with the MN according to the configuration message further includes:

determining, by the first HA-U according to the HoA of the MN included in a third data packet, that the third data packet is a data packet sent by the CN to the MN; and performing, by the first HA-U, tunnel encapsulation on the third data packet according to the CoA of the MN to obtain a fourth data packet, and forwarding the fourth data packet to the MN, so that the MN performs tunnel decapsulation on the fourth data packet to obtain the third data packet.

With reference to the first or the second possible implementation of the second aspect, in a third possible implementation of the second aspect, the configuration message further includes a tunnel type, and the tunnel type is used to indicate a tunnel protocol used when tunnel communication is performed; and correspondingly, the performing, by the first HA-U, tunnel decapsulation on the first data packet includes:

performing, by the first HA-U, tunnel decapsulation on the first data packet according to the tunnel protocol corresponding to the tunnel type.

With reference to the third possible implementation of the second aspect, in a fourth possible implementation of the second aspect, the configuration message further includes a tunnel parameter, and the tunnel parameter is a related parameter used when tunnel communication is performed by using the tunnel protocol indicated by the tunnel type; and correspondingly, the performing, by the first HA-U, tunnel decapsulation on the first data packet according to the tunnel protocol corresponding to the tunnel type includes:

performing, by the first HA-U, tunnel decapsulation on the first data packet according to the tunnel parameter and the tunnel protocol corresponding to the tunnel type.

With reference to any one of the second aspect, or the first to the fourth possible implementations of the second aspect, in a fifth possible implementation of the second aspect, after the performing, by the first HA-U, tunnel communication with the MN according to the configuration message, the method further includes:

receiving, by the first HA-U, a mobile prefix solicitation MPS message sent by the MN, and returning a mobile prefix advertisement MPA message to the MN.

With reference to any one of the second aspect, or the first to the fifth possible implementations of the second aspect, in a sixth possible implementation of the second aspect, after the performing, by the first HA-U, tunnel communication with the MN according to the configuration message, the method further includes:

receiving, by the first HA-U, a home test initialization HTI message sent by the MN, and forwarding the HTI message to the CN.

According to a third aspect, the present disclosure provides a mobility management method, applied to a communications system, where the communications system includes a home agent control plane HA-C, a first home agent user plane HA-U, and a mobile node MN; the first HA-U is located in a first network, the first HA-U is deployed on a first proxy server or a gateway, and the HA-C is deployed on a second proxy server; and the method includes:

sending, by the MN, a first binding update BU message to the HA-C when the MN accesses the first network;

receiving, by the MN, a first binding acknowledgement BA message sent by the HA-C, where the first BA message includes an address of the first HA-U;

sending, by the MN, a second BU message to the HA-C after the MN moves from the first network to a second network different from the first network, where the second BU message includes a home address HoA and a care-of address CoA that are of the MN, so that the HA-C sends the HoA and the CoA that are of the MN to the first HA-U by using a configuration message; and performing, by the MN, tunnel communication with the first HA-U according to the address of the first HA-U.

With reference to the third aspect, in a first possible implementation of the third aspect, the communications system further includes a second HA-U, and the second HA-U is located in the second network; and after the sending, by the MN, a second BU message to the HA-C, the method further includes:

receiving, by the MN, a second BA message sent by the HA-C, where the second BA message includes an address of the second HA-U.

With reference to the third aspect or the first possible implementation of the third aspect, in a second possible implementation of the third aspect, if the MN moves from the second network to a third network different from the second network, the MN performs tunnel communication with the second HA-U according to the second BA message.

With reference to any one of the third aspect, or the first or the second possible implementation of the third aspect, in a third possible implementation of the third aspect, the communications system further includes a correspondent node CN, and the CN communicates with the MN by using the first network; and the performing, by the MN, tunnel communication with the first HA-U according to the address of the first HA-U includes:

performing, by the MN, tunnel encapsulation on a second data packet according to the address of the first HA-U to obtain a first data packet, and sending the first data packet to the first HA-U, so that the first HA-U performs tunnel decapsulation on the first data packet to obtain the second data packet, and forwards the second data packet to the CN, where the second data packet is a data packet sent by the MN to the CN.

With reference to the third possible implementation of the third aspect, in a fourth possible implementation of the third aspect, the performing, by the MN, tunnel communication with the first HA-U according to the address of the first HA-U further includes:

receiving, by the MN, a fourth data packet sent by the first HA-U, where the fourth data packet is a data packet obtained after the first HA-U performs tunnel encapsulation on a third data packet according to the CoA of the MN, and the third data packet is a data packet sent by the CN to the MN; and performing, by the MN, tunnel decapsulation on the fourth data packet to obtain the third data packet.

With reference to the third or the fourth possible implementation of the third aspect, in a fifth possible implementation of the third aspect, the first BA message further includes a tunnel type, and the tunnel type is used to indicate a tunnel protocol used when tunnel communication is performed; and the performing, by the MN, tunnel encapsulation on a second data packet according to the address of the first HA-U includes:

performing, by the MN, tunnel encapsulation on the second data packet according to the address of the first HA-U and the tunnel protocol corresponding to the tunnel type.

With reference to the fifth possible implementation of the third aspect, in a sixth possible implementation of the third aspect, the first BA message further includes a tunnel parameter, and the tunnel parameter is a related parameter used when tunnel communication is performed by using the tunnel protocol indicated by the tunnel type; and the performing, by the MN, tunnel encapsulation on the second data packet according to the address of the first HA-U and the tunnel protocol corresponding to the tunnel type includes:

performing, by the MN, tunnel encapsulation on the second data packet according to the address of the first HA-U, the tunnel parameter, and the tunnel protocol corresponding to the tunnel type.

With reference to any one of the third aspect, or the first to the sixth possible implementations of the third aspect, in a seventh possible implementation of the third aspect, after the performing, by the MN, tunnel communication with the first HA-U according to the address of the first HA-U, the method further includes:

sending, by the MN, a mobile prefix solicitation MPS message to the HA-C, and receiving a mobile prefix advertisement MPA message sent by the HA-C; or sending, by the MN, an MPS message to the first HA-U, and receiving an MPA message sent by the first HA-U.

With reference to any one of the third aspect, or the first to the seventh possible implementations of the third aspect, in an eighth possible implementation of the third aspect, after the performing, by the MN, tunnel communication with the first HA-U according to the address of the first HA-U, the method further includes:

sending, by the MN, a home test initialization HTI message to the HA-C; or sending, by the MN, an HTI message to the first HA-U.

According to a fourth aspect, the present disclosure provides a mobility management apparatus, where the apparatus is a home agent control plane HA-C; the apparatus is applied to a communications system, and the communications system includes the HA-C, a first home agent user plane HA-U, and a mobile node MN; the first HA-U is located in a first network, the first HA-U is deployed on a first proxy server or a gateway, and the HA-C is deployed on a second proxy server; and the apparatus includes:

a receiving module, configured to receive a first binding update BU message sent by the MN when the MN accesses the first network; and a sending module, configured to send a first binding acknowledgement BA message to the MN according to the first BU message, where the first BA message includes an address of the first HA-U, so that the MN performs tunnel communication with the first HA-U according to the address of the first HA-U after the MN moves from the first network to a second network; where the receiving module is further configured to receive a second BU message sent by the MN after the MN moves from the first network to the second network, where the second BU message includes a home address HoA and a care-of address CoA that are of the MN; and the sending module is further configured to send a configuration message to the first HA-U, where the configuration message includes the HoA and the CoA that are of the MN, so that the first HA-U performs tunnel communication with the MN according to the configuration message.

With reference to the fourth aspect, in a first possible implementation of the fourth aspect, if the first network includes at least two HA-Us, and the at least two HA-Us are separately deployed on different proxy servers or different gateways, the apparatus further includes a processing module, configured to determine, according to a load balance rule, the first HA-U from the at least two HA-Us included in the first network.

With reference to the first possible implementation of the fourth aspect, in a second possible implementation of the fourth aspect, the processing module is specifically configured to determine an HA-U with minimum load in the at least two HA-Us included in the first network as the first HA-U.

With reference to the first or the second possible implementation of the fourth aspect, in a third possible implementation of the fourth aspect, the first BU message includes the HoA of the MN; and the processing module is further configured to: create a binding cache entry BCE for the MN, where the BCE includes the address of the first HA-U and the HoA; and update the BCE according to the CoA of the MN included in the second BU message, to obtain an updated BCE, where the updated BCE includes the address of the first HA-U, the HoA, and the CoA.

With reference to any one of the fourth aspect, or the first to the third possible implementations of the fourth aspect, in a fourth possible implementation of the fourth aspect, the communications system further includes a second HA-U, and the second HA-U is located in the second network;

the processing module is further configured to determine that an HA-U of the MN includes the second HA-U located in the second network; and the sending module is further configured to send a second BA message to the MN, where the second BA message includes an address of the second HA-U, so that the MN performs tunnel communication with the second HA-U according to the address of the second HA-U after the MN moves from the second network to a third network different from the second network.

With reference to the fourth possible implementation of the fourth aspect, in a fifth possible implementation of the fourth aspect, if the second network includes at least two HA-Us, and the at least two HA-Us are separately deployed on different proxy servers or different gateways, the processing module is specifically configured to: determine that the HA-U of the MN includes an HA-U located in the second network; and determine, according to the load balance rule from the at least two HA-Us included in the second network, that the HA-U that is in the second network and that is of the MN is the second HA-U.

With reference to any one of the fourth aspect, or the first to the fifth possible implementations of the fourth aspect, in a sixth possible implementation of the fourth aspect, the configuration message further includes a tunnel type, and the tunnel type is used to indicate a tunnel protocol used when tunnel communication is performed; and the first BA message further includes the tunnel type.

With reference to the sixth possible implementation of the fourth aspect, in a seventh possible implementation of the fourth aspect, the configuration message further includes a tunnel parameter, and the tunnel parameter is a related parameter used when tunnel communication is performed by using the tunnel protocol indicated by the tunnel type; and the first BA message further includes the tunnel parameter.

With reference to any one of the fourth aspect, or the first to the seventh possible implementations of the fourth aspect, in an eighth possible implementation of the fourth aspect, the receiving module is further configured to receive a mobile prefix solicitation MPS message sent by the MN; and the sending module is further configured to return a mobile prefix advertisement MPA message to the MN.

With reference to any one of the fourth aspect, or the first to the eighth possible implementations of the fourth aspect, in a ninth possible implementation of the fourth aspect, the communications system further includes a correspondent node CN, and the CN communicates with the MN by using the first network;

the receiving module is further configured to receive a home test initialization HTI message sent by the MN; and the sending module is further configured to forward the HTI message to the CN.

According to a fifth aspect, the present disclosure provides a mobility management apparatus, where the apparatus is a first home agent user plane HA-U; the apparatus is applied to a communications system, and the communications system includes a home agent control plane HA-C, the first HA-U, and a mobile node MN; the first HA-U is located in a first network, the first HA-U is deployed on a first proxy server or a gateway, and the HA-C is deployed on a second proxy server; and the apparatus includes:

a receiving module, configured to receive a configuration message sent by the HA-C, where the configuration message includes a home address HoA and a care-of address CoA that are of the MN; and a tunnel communication module, configured to perform tunnel communication with the MN according to the configuration message.

With reference to the fifth aspect, in a first possible implementation of the fifth aspect, the communications system further includes a correspondent node CN, and the CN communicates with the MN by using the first network; and the tunnel communication module is specifically configured to:

receive a first data packet sent by the MN, where the first data packet is a data packet obtained after the MN performs tunnel encapsulation on a second data packet according to an address of the first HA-U, and the second data packet is a data packet sent by the MN to the CN; and perform tunnel decapsulation on the first data packet to obtain the second data packet, and forward the second data packet to the CN.

With reference to the first possible implementation of the fifth aspect, in a second possible implementation of the fifth aspect, the tunnel communication module is further configured to:

determine, according to the HoA of the MN included in a third data packet, that the third data packet is a data packet sent by the CN to the MN; and perform tunnel encapsulation on the third data packet according to the CoA of the MN to obtain a fourth data packet, and forward the fourth data packet to the MN, so that the MN performs tunnel decapsulation on the fourth data packet to obtain the third data packet.

With reference to the first or the second possible implementation of the fifth aspect, in a third possible implementation of the fifth aspect, the configuration message further includes a tunnel type, and the tunnel type is used to indicate a tunnel protocol used when tunnel communication is performed; and correspondingly, the tunnel communication module is specifically configured to perform tunnel decapsulation on the first data packet according to the tunnel protocol corresponding to the tunnel type.

With reference to the third possible implementation of the fifth aspect, in a fourth possible implementation of the fifth aspect, the configuration message further includes a tunnel parameter, and the tunnel parameter is a related parameter used when tunnel communication is performed by using the tunnel protocol indicated by the tunnel type; and correspondingly, the tunnel communication module is specifically configured to perform tunnel decapsulation on the first data packet according to the tunnel parameter and the tunnel protocol corresponding to the tunnel type.

With reference to any one of the fifth aspect, or the first to the fourth possible implementations of the fifth aspect, in a fifth possible implementation of the fifth aspect, the receiving module is further configured to receive a mobile prefix solicitation MPS message sent by the MN; and the apparatus further includes a first sending module, configured to return a mobile prefix advertisement MPA message to the MN.

With reference to any one of the fifth aspect, or the first to the fifth possible implementations of the fifth aspect, in a sixth possible implementation of the fifth aspect, the receiving module is further configured to receive a home test initialization HTI message sent by the MN; and the apparatus further includes a second sending module, configured to forward the HTI message to the CN.

According to a sixth aspect, the present disclosure provides a mobility management apparatus, where the apparatus is a mobile node MN; the apparatus is applied to a communications system, and the communications system includes a home agent control plane HA-C, a first home agent user plane HA-U, and the MN; the first HA-U is located in a first network, the first HA-U is deployed on a first proxy server or a gateway, and the HA-C is deployed on a second proxy server; and the apparatus includes:

a sending module, configured to send a first binding update BU message to the HA-C when the MN accesses the first network;

a receiving module, configured to receive a first binding acknowledgement BA message sent by the HA-C, where the first BA message includes an address of the first HA-U; where the sending module is further configured to send a second BU message to the HA-C after the MN moves from the first network to a second network different from the first network, where the second BU message includes a home address HoA and a care-of address CoA that are of the MN, so that the HA-C sends the HoA and the CoA that are of the MN to the first HA-U by using a configuration message; and a tunnel communication module, configured to perform tunnel communication with the first HA-U according to the address of the first HA-U.

With reference to the sixth aspect, in a first possible implementation of the sixth aspect, the communications system further includes a second HA-U, and the second HA-U is located in the second network; and the receiving module is further configured to receive a second BA message sent by the HA-C, where the second BA message includes an address of the second HA-U.

With reference to the first possible implementation of the sixth aspect, in a second possible implementation of the sixth aspect, if the MN moves from the second network to a third network different from the second network, the tunnel communication module is further configured to perform tunnel communication with the second HA-U according to the second BA message.

With reference to any one of the sixth aspect, or the first or the second possible implementation of the sixth aspect, in a third possible implementation of the sixth aspect, the communications system further includes a correspondent node CN, and the CN communicates with the MN by using the first network; and the tunnel communication module is specifically configured to: perform tunnel encapsulation on a second data packet according to the address of the first HA-U to obtain a first data packet, and send the first data packet to the first HA-U, so that the first HA-U performs tunnel decapsulation on the first data packet to obtain the second data packet, and forwards the second data packet to the CN, where the second data packet is a data packet sent by the MN to the CN.

With reference to the third possible implementation of the sixth aspect, in a fourth possible implementation of the sixth aspect, the tunnel communication module is further configured to:

receive a fourth data packet sent by the first HA-U, where the fourth data packet is a data packet obtained after the first HA-U performs tunnel encapsulation on a third data packet according to the CoA of the MN, and the third data packet is a data packet sent by the CN to the MN; and perform tunnel decapsulation on the fourth data packet to obtain the third data packet.

With reference to the third or the fourth possible implementation of the sixth aspect, in a fifth possible implementation of the sixth aspect, the first BA message further includes a tunnel type, and the tunnel type is used to indicate a tunnel protocol used when tunnel communication is performed; and correspondingly, the tunnel communication module is specifically configured to perform tunnel encapsulation on the second data packet according to the address of the first HA-U and the tunnel protocol corresponding to the tunnel type.

With reference to the fifth possible implementation of the sixth aspect, in a sixth possible implementation of the sixth aspect, the first BA message further includes a tunnel parameter, and the tunnel parameter is a related parameter used when tunnel communication is performed by using the tunnel protocol indicated by the tunnel type; and correspondingly, the tunnel communication module is specifically configured to perform tunnel encapsulation on the second data packet according to the address of the first HA-U, the tunnel parameter, and the tunnel protocol corresponding to the tunnel type.

With reference to any one of the sixth aspect, or the first to the sixth possible implementations of the sixth aspect, in a seventh possible implementation of the sixth aspect, the sending module is further configured to send a mobile prefix solicitation MPS message to the HA-C; and the receiving module is further configured to receive a mobile prefix advertisement MPA message sent by the HA-C.

With reference to any one of the sixth aspect, or the first to the seventh possible implementations of the sixth aspect, in an eighth possible implementation of the sixth aspect, the sending module is further configured to send a home test initialization HTI message to the HA-C.

According to a seventh aspect, the present disclosure provides a mobility management system, where the system is a communications system; and the communications system includes the home agent control plane HA-C according to any one of the fourth aspect or the first to the tenth possible implementations of the fourth aspect, the first home agent user plane HA-U according to any one of the fifth aspect or the first to the sixth possible implementations of the fifth aspect, and the mobile node MN and the correspondent node CN according to any one of the sixth aspect or the first to the seventh possible implementations of the sixth aspect.

The present disclosure provides a mobility management method, apparatus, and system. An HA-C sends a first BA message to an MN, where the first BA message includes an address of a first HA-U, so that the MN performs tunnel communication with the first HA-U according to the first BA message; and the HA-C sends a configuration message to the first HA-U, where the configuration message includes an HoA and a CoA that are of the MN, so that the first HA-U performs tunnel communication with the MN according to the configuration message. In this way, an original proxy server or an original gateway (that is, a proxy server or a gateway in the prior art, that is, a proxy server or a gateway deployed with the first HA-U) completes only tunnel communication with the MN, and a newly-added proxy server (that is, a second proxy server, that is, a proxy server deployed with the HA-C) completes control signaling interaction with a BU, thereby reducing load of the original proxy server or the original gateway, and resolving a prior-art problem that load of a proxy server or a gateway is relatively heavy.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
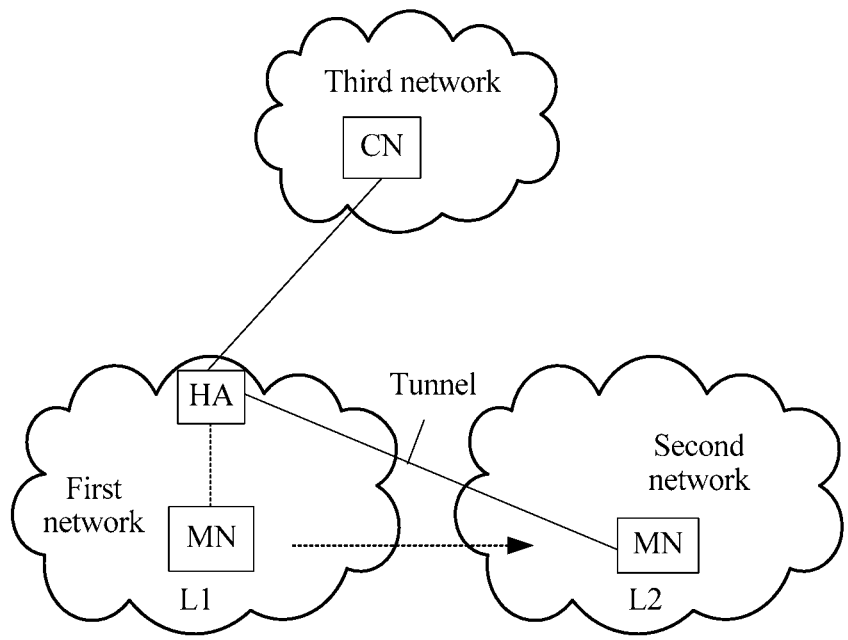
FIG. 1 is a schematic structural diagram of a mobility management system in the prior art.

FIG. 1 is a schematic structural diagram of a mobility management system in the prior art. As shown in FIG. 1, in a communications system, when an MN initially accesses a first network, an HA allocates an HoA to the MN, and then the MN communicates with a CN by using the HoA. When the MN moves from a location L1 to a location L2 along a direction shown by a dashed line arrow in FIG. 1, the MN obtains a CoA allocated by a second network to the MN, and sends the HoA and the CoA to the HA by using a BU message. The HA creates a BCE for the MN, and returns a BA message to the MN. To avoid a problem that communication between the MN and the CN is interrupted because the MN moves to the second network, the HA intercepts a data packet sent by the CN to the MN, and forwards the data packet to the MN by means of tunnel communication. Similarly, when the MN needs to send a data packet to the CN, the MN sends the data packet to the HA by means of tunnel communication, and then the HA forwards the data packet to the CN.

Generally, the HA is deployed on a proxy server or a gateway. In the prior art, the HA completes not only control signaling interaction (such as a BA message and a BU message) but also tunnel-based data packet forwarding. Therefore, load of the proxy server or the gateway is relatively heavy.

Figure 2:
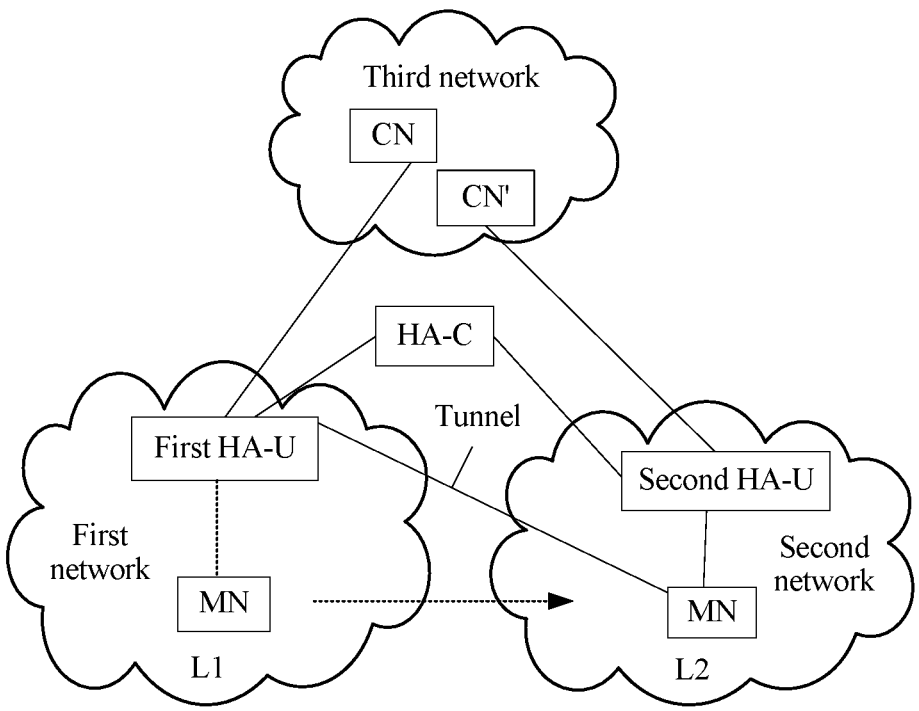
FIG. 2 is a schematic structural diagram of a mobility management system according to the present disclosure.

FIG. 2 is a schematic structural diagram of a mobility management system according to the present disclosure. As shown in FIG. 2, a communications system includes a home agent control plane (HA-C, Home Agent Control plane), a first home agent user plane (HA-U, Home Agent User plane), an MN, and a CN. The first HA-U is located in a first network, the CN communicates with the MN by using the first network, the HA-C is deployed on a first proxy server or a gateway, and the first HA-U is deployed on a second proxy server.

Optionally, the communications system may further include a second HA-U and a CN', and the second HA-U is located in a second network. When the MN located in the second network establishes a service with the CN', data is forwarded by using the second HA-U.

It should be noted that the CN in FIG. 2 located in a third network is merely an example, and the CN may be located in any network, provided that the CN communicates with the MN by using the first network. The CN' in FIG. 2 located in the third network is also merely an example, and the CN' may be located in any network.

It should be noted that the communications system in the present disclosure may be a Global System for Mobile Communications (GSM), a Universal Mobile Telecommunications System (UMTS), a Long Term Evolution (LTE) system, or the like. When the communications system is the GSM or the UMTS, the gateway may be a gateway GPRS support node (GGSN). When the communications system is the LTE system, the gateway may be a PGW.

It should be noted that the first network in the present disclosure is a network in which the first HA-U is located, and the second network is a network in which the second HA-U is located. Each network may include one or more HA-Us, but each HA-U can be located in only one network. When a quantity of HA-Us in a network is greater than one, load balancing may be performed between HA-Us located in the network.

Figure 3:
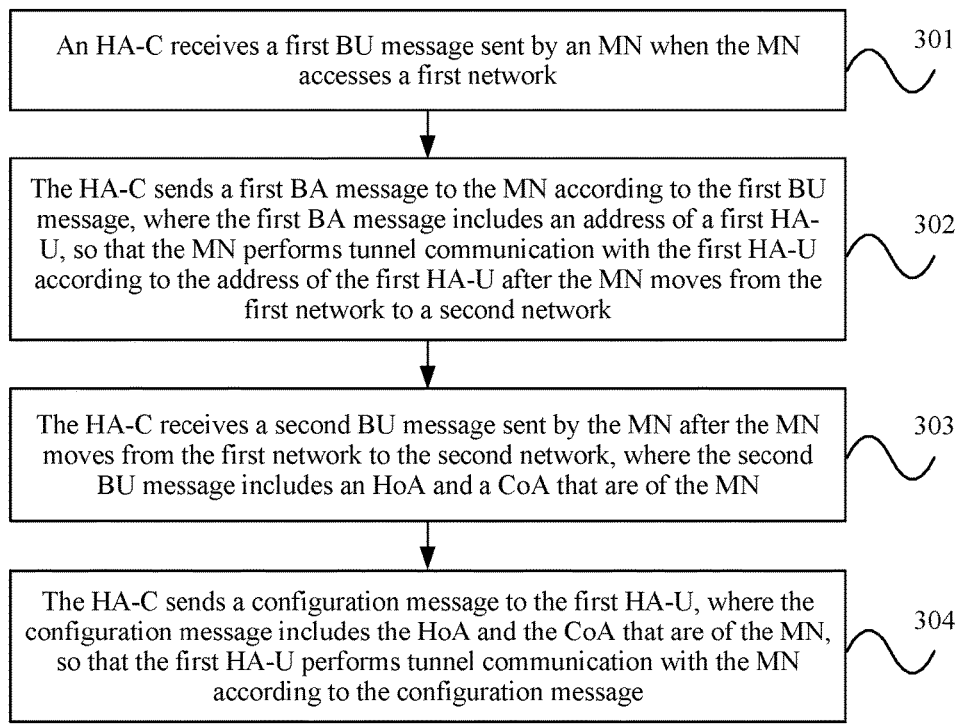
FIG. 3 is a flowchart of Embodiment 1 of a mobility management method according to the present disclosure.

FIG. 3 is a flowchart of Embodiment 1 of a mobility management method according to the present disclosure. As shown in FIG. 2 and FIG. 3, the method in this embodiment may include the following steps:

Step 301: An HA-C receives a first BU message sent by an MN when the MN accesses a first network.

Step 302: The HA-C sends a first BA message to the MN according to the first BU message, where the first BA message includes an address of a first HA-U, so that the MN performs tunnel communication with the first HA-U according to the address of the first HA-U after the MN moves from the first network to a second network.

Step 303: The HA-C receives a second BU message sent by the MN after the MN moves from the first network to the second network, where the second BU message includes an HoA and a CoA that are of the MN.

Specifically, as shown in FIG. 2, when the MN moves from a location L1 to a location L2 along a direction shown by a dashed line arrow in FIG. 2, the MN sends the second BU message to the HA-C, and the HA-C receives the second BU message.

Step 304: The HA-C sends a configuration message to the first HA-U, where the configuration message includes the HoA and the CoA that are of the MN, so that the first HA-U performs tunnel communication with the MN according to the configuration message.

In the prior art, after an MN moves to a second network, an HA located in a first network receives a BU message (the BU message includes an HoA and a CoA that are of the MN) sent by the MN, and the HA sends a BA message to the MN. To avoid a problem that communication between the MN and a CN is interrupted because the MN moves to the second network, the HA performs tunnel communication with the MN. In this way, a data packet sent by the CN to the MN is intercepted by the HA and is sent to the MN by means of tunnel communication, the MN sends a data packet that is to be sent to the CN to the HA by means of tunnel communication, and the HA forwards the data packet to the CN. In the present disclosure, an HA-C sends a first BA message to an MN, where the first BA message includes an address of the first HA-U, so that the MN performs tunnel communication with the first HA-U according to the address of the first HA-U. The HA-C sends a configuration message to the first HA-U, where the configuration message includes an HoA and a CoA that are of the MN, so that the first HA-U performs tunnel communication with the MN according to the configuration message.

In the prior art, the HA completes not only control signaling interaction (for example, the HA receives the BU message sent by the MN and sends the BA message to the MN) but also data packet forwarding during tunnel communication (for example, the HA intercepts a data packet sent by the CN to the MN and forwards the data packet to the MN by means of tunnel communication, and the HA receives a data packet from the MN by means of tunnel communication and forwards the data packet to the CN); and the HA is generally deployed on a proxy server or a gateway. Therefore, load of the proxy server or the gateway is relatively heavy. In the present disclosure, the HA-C sends the first BA message to the MN, where the first BA message includes the address of the first HA-U, so that the MN performs tunnel communication with the first HA-U according to the first BA message; and the HA-C sends the configuration message to the first HA-U, where the configuration message includes the HoA and the CoA that are of the MN, so that the first HA-U performs tunnel communication with the MN according to the configuration message. In this way, an original proxy server or an original gateway (that is, a proxy server or a gateway in the prior art, that is, a proxy server or a gateway deployed with the first HA-U) completes only tunnel communication with the MN, and a newly-added proxy server (that is, a second proxy server, that is, a proxy server deployed with the HA-C) completes control signaling interaction with a BU, thereby reducing load of the original proxy server or the original gateway, and resolving a prior-art problem that load of a proxy server or a gateway is relatively heavy.

In this embodiment of the present disclosure, an HA-C sends a first BA message to an MN, where the first BA message includes an address of the first HA-U, so that the MN performs tunnel communication with the first HA-U according to the first BA message; and the HA-C sends a configuration message to the first HA-U, where the configuration message includes an HoA and a CoA that are of the MN, so that the first HA-U performs tunnel communication with the MN according to the configuration message. In this way, an original proxy server or an original gateway (that is, a proxy server or a gateway in the prior art, that is, a proxy server or a gateway deployed with the first HA-U) completes only tunnel communication with the MN, and a newly-added proxy server (that is, a second proxy server, that is, a proxy server deployed with the HA-C) completes control signaling interaction with a BU, thereby reducing load of the original proxy server or the original gateway, and resolving a prior-art problem that load of a proxy server or a gateway is relatively heavy.

Figure 4:
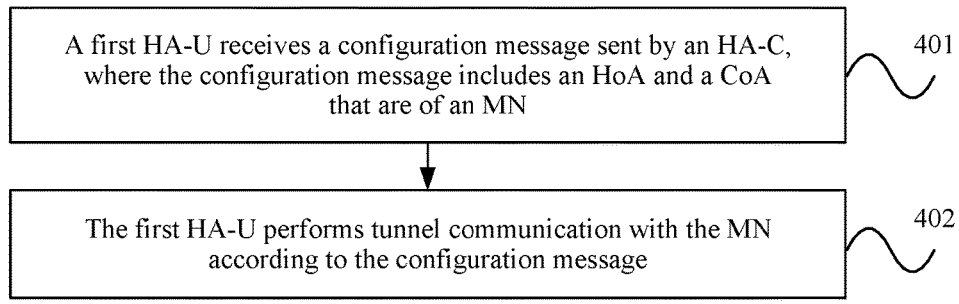
FIG. 4 is a flowchart of Embodiment 2 of a mobility management method according to the present disclosure.

FIG. 4 is a flowchart of Embodiment 2 of a mobility management method according to the present disclosure. As shown in FIG. 2 and FIG. 4, the method in this embodiment may include the following steps:

Step 401: A first HA-U receives a configuration message sent by an HA-C, where the configuration message includes an HoA and a CoA that are of an MN.

Step 402: The first HA-U performs tunnel communication with the MN according to the configuration message.

In this embodiment, a first HA-U receives a configuration message sent by an HA-C, where the configuration message includes an HoA and a CoA that are of an MN; and the first HA-U performs tunnel communication with the MN according to the configuration message. In this way, when the MN moves from a first network to a second network, the first HA-U performs tunnel communication with the MN according to the HoA and the CoA that are of the MN and that are sent by the HA-C, so as to forward a data packet 1 (the data packet 1 is a data packet sent by a CN to the MN) to the MN, and forward, to the CN, a data packet 2 (the data packet 2 is a data packet sent by the MN to the CN) sent by the MN, thereby avoiding a problem that communication between the MN and the CN is interrupted because the MN moves to the second network.

Figure 5:
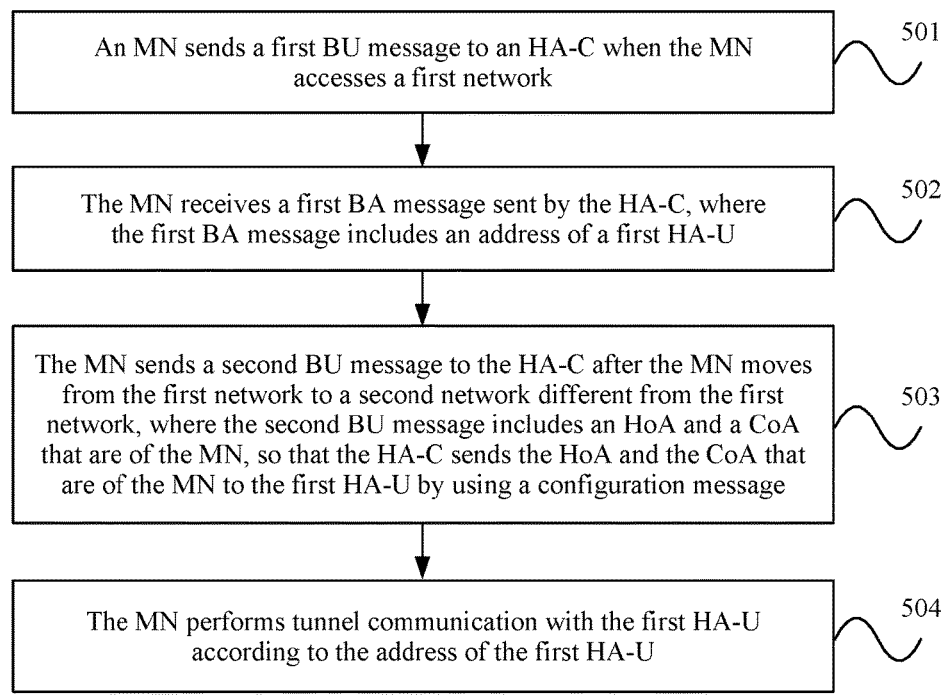
FIG. 5 is a flowchart of Embodiment 3 of a mobility management method according to the present disclosure.

FIG. 5 is a flowchart of Embodiment 3 of a mobility management method according to the present disclosure. As shown in FIG. 2 and FIG. 5, the method in this embodiment may include the following steps:

Step 501: An MN sends a first BU message to an HA-C when the MN accesses a first network.

Step 502: The MN receives a first BA message sent by the HA-C, where the first BA message includes an address of a first HA-U.

Step 503: The MN sends a second BU message to the HA-C after the MN moves from the first network to a second network different from the first network, where the second BU message includes an HoA and a CoA that are of the MN, so that the HA-C sends the HoA and the CoA that are of the MN to the first HA-U by using a configuration message.

Step 504: The MN performs tunnel communication with the first HA-U according to the address of the first HA-U.

In this embodiment, an MN receives a first BA message sent by an HA-C, where the first BA message includes an address of a first HA-U; and the MN performs tunnel communication with the first HA-U according to the address of the first HA-U. In this way, after the MN moves from a first network to a second network, the MN performs tunnel communication with the first HA-U according to the address of the first HA-U, so as to send a data packet 2 (the data packet 2 is a data packet sent by the MN to a CN) to the first HA-U by means of tunnel communication, and receive a data packet 1 (the data packet 1 is a data packet sent by the CN to the MN) sent by the first HA-U by means of tunnel communication, so that the first HA-U forwards the data packet 2 to the CN, thereby avoiding a problem that communication between the MN and the CN is interrupted because the MN moves to the second network.

Figure 6:
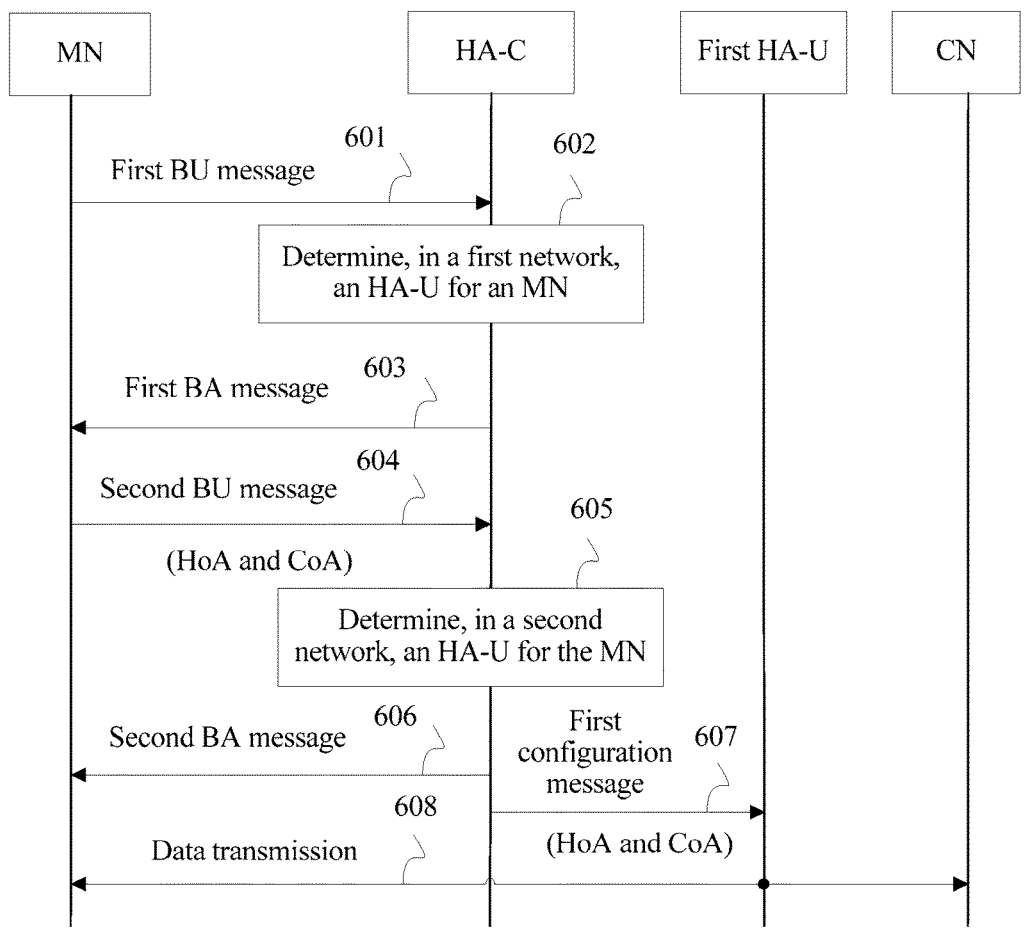
FIG. 6 is a flowchart of Embodiment 4 of a mobility management method according to the present disclosure.

FIG. 6 is a flowchart of Embodiment 4 of a mobility management method according to the present disclosure. As shown in FIG. 2 and FIG. 6, the method in this embodiment may include the following steps.

Step 601: An MN sends a first BU message to an HA-C when the MN accesses a first network.

Step 602: If the first network includes at least two HA-Us, and the at least two HA-Us are separately deployed on different proxy servers or different gateways, the HA-C determines, according to a load balance rule, a first HA-U from the at least two HA-Us included in the first network.

Optionally, that the HA-C determines, according to a load balance rule, a first HA-U from the at least two HA-Us included in the first network includes:

the HA-C determines an HA-U with minimum load in the at least two HA-Us included in the first network as the first HA-U.

It should be noted that step 602 is an optional step. When only one HA-U is located in the first network, step 602 does not need to be performed, and the only one HA-U is directly determined as the first HA-U, and a first BA message includes an address of the first HA-U; or when multiple HA-Us are located in the first network, step 602 needs to be performed. The HA-C determines, according to the load balance rule, the first HA-U from the at least two HA-Us included in the first network, so that load can be shared among multiple HA-Us in the first network, so as to reduce load of a single HA-U.

Step 603: The HA-C sends a first BA message to the MN, where the first BA message includes an address of the first HA-U.

It should be noted that when a mobile IP is a mobile IPv6 based on IPv6, the address of the first HA-U may be an IPv6 address of the first HA-U; or when a mobile IP is a dual-stack mobile IPv6 based on IPv6, the address of the first HA-U may be an IPv4 address and an IPv6 address that are of the first HA-U.

Step 604: The MN sends a second BU message to the HA-C after the MN moves from the first network to a second network different from the first network, where the second BU message includes an HoA and a CoA that are of the MN.

Optionally, the first BU message in step 601 may include the HoA of the MN. Correspondingly, after step 602, the method may further include: creating, by the HA-C, a BCE for the MN, where the BCE includes the address of the first HA-U and the HoA. After step 604, the method may further include: updating, by the HA-C, the BCE according to the CoA of the MN included in the second BU message, to obtain an updated BCE, where the updated BCE includes the address of the first HA-U, the HoA, and the CoA.

Step 605: The HA-C determines, in the second network, a second HA-U for the MN.

Optionally, if the second network includes at least two HA-Us, and the at least two HA-Us are separately deployed on different proxy servers or different gateways, that the HA-C determines, in the second network, a second HA-U for the MN includes: the HA-C determines, according to the load balance rule, the second HA-U for the MN from the at least two HA-Us included in the second network.

Step 606: The HA-C sends a second BA message to the MN, where the second BA message includes an address of the second HA-U.

Step 607: The HA-C sends a configuration message to the first HA-U, where the configuration message includes the HoA and the CoA that are of the MN.

It should be noted that there is no sequence among step 607, step 605, and step 606.

Step 608: The MN performs tunnel communication with the first HA-U, to implement data transmission between the MN and a CN.

Optionally, the MN performs tunnel communication with the first HA-U based on the IP-in-IP protocol.

Optionally, step 608 may include:

performing, by the MN, tunnel encapsulation on a second data packet according to the address of the first HA-U to obtain a first data packet, and sending the first data packet to the first HA-U, where the second data packet is a data packet sent by the MN to the CN;

receiving, by the first HA-U, the first data packet sent by the MN; and performing, by the first HA-U, tunnel decapsulation on the first data packet to obtain the second data packet, and forwarding the second data packet to the CN.

It should be noted that because the second data packet is a data packet sent by the MN to the CN, a source address of the second data packet is the HoA of the MN, and a destination address of the second data packet is an address of the CN. When the MN performs tunnel encapsulation on the second data packet according to the address of the first HA-U, the second data packet is encapsulated into the first data packet, a source address of the first data packet is the HoA of the MN, and a destination address of the first data packet is the address of the first HA-U. Because the destination address of the first data packet is the address of the first HA-U, the first data packet may be routed to the first HA-U by using communication links in the first network and the second network. The first HA-U performs decapsulation to obtain the second data packet encapsulated into the first data packet. Because the destination address of the second data packet is the address of the CN, the second data packet may be routed to the CN by using a communication link in the first network. After receiving the second data packet, the CN may determine, according to the source address of the second data packet, that the second data packet is from the MN.

Optionally, step 608 may further include:

determining, by the first HA-U according to the HoA of the MN included in a third data packet, that the third data packet is a data packet sent by the CN to the MN.

It should be noted that because the third data packet is a data packet sent by the CN to the MN, a destination address of the third data packet is the HoA of the MN. The HA-U may determine, according to the HoA of the MN included in the third data packet, that the third data packet is a data packet sent by the CN to the MN.

The first HA-U performs tunnel encapsulation on the third data packet according to the CoA of the MN to obtain a fourth data packet, and forwards the fourth data packet to the MN.

The MN receives the fourth data packet sent by the first HA-U, and performs tunnel decapsulation on the fourth data packet to obtain the third data packet.

In this embodiment, an HA-C sends an address of a first HA-U to the MN, so that the MN performs tunnel communication with the first HA-U according to the address of the first HA-U; and the HA-C sends an HoA and a CoA that are of the MN to the first HA-U, so that the first HA-U performs tunnel communication with the MN according to the HoA and the CoA. In this way, an original proxy server or an original gateway (that is, a proxy server or a gateway in the prior art, that is, a proxy server or a gateway deployed with the first HA-U) completes only tunnel communication with the MN, and a newly-added proxy server (that is, a second proxy server, that is, a proxy server deployed with the HA-C) completes control signaling interaction with a BU, thereby reducing load of the original proxy server or the original gateway, and resolving a prior-art problem that load of a proxy server or a gateway is relatively heavy.

In addition, development of a current cloud computing technology drives development of network function virtualization, and virtualization is performed on various physical network elements in a current network, that is, a current physical network element device is run in a virtualization soft form on a host of a data center. The data center is usually established at a higher location. For example, an operator may establish a data center at a site, and the data center is responsible for several urban areas.

In the prior art, because an HA completes not only control signaling interaction but also data packet forwarding based on tunnel communication. When virtualization is performed on the HA and the HA is run in a data center, a data packet (that is, a data packet that needs to be forwarded by means of tunnel communication) needs to be processed by flowing through the data center. This undoubtedly causes a heavy burden on bandwidth of the data center. In the present disclosure, when an original proxy server or an original gateway (that is, a proxy server or a gateway in the prior art, that is, a proxy server or a gateway deployed with a first HA-U) completes only tunnel communication with an MN, and a newly-added proxy server (that is, a second proxy server, that is, a proxy server or a gateway deployed with an HA-C) completes control signaling interaction with the MN, virtualization can be performed only on the HA-C and the HA-C is run in the data center, and virtualization is not performed on the first HA-U. When virtualization is implemented, a problem that the data packet needs to be processed by flowing through the data center is avoided, thereby reducing a quantity of data packets that flow into the data center, and alleviating a burden on bandwidth of the data center.

Optionally, the first BA message and the configuration message in this embodiment may further include a tunnel type, and the tunnel type is used to indicate a tunnel protocol used when tunnel communication is performed. Correspondingly, the MN and the first HA-U may perform tunnel encapsulation or tunnel decapsulation on a data packet according to the tunnel protocol corresponding to the tunnel type.

The tunnel protocol may be the IP-in-IP protocol, the Generic Routing Encapsulation (GRE, Generic Routing Encapsulation), or the like. A protocol document corresponding to the IP-in-IP protocol is RFC2003, and a protocol document corresponding to GRE is RFC2784.

Further, optionally, the first BA message and the configuration message may further include a tunnel parameter, and the tunnel parameter is a related parameter used when tunnel communication is performed by using the tunnel protocol indicated by the tunnel type. Correspondingly, the MN and the first HA-U may perform tunnel encapsulation or tunnel decapsulation on a data packet according to the tunnel parameter and the tunnel protocol corresponding to the tunnel type.

Optionally, the first BA message in this embodiment may further include a system type identifier, and the system type identifier is used to indicate that the communications system is a communications system including the first HA-U and the HA-C.

Optionally, after step 604 in this embodiment, the method may further include: sending, by the MN, a mobile prefix solicitation (MPS, Mobile Prefix Solicitation) message to the HA-C, and returning, by the HA-C, a mobile prefix advertisement (MPA, Mobile Prefix Advertisement) message to the MN; or sending, by the MN, an MPS message to the first HA-U, and returning, by the first HA-U, an MPA message to the MN. The MN sends the MPS message to the HA-C (or the first HA-U), and the HA-C (or the first HA-U) returns the MPA to the MN, so that the MN can obtain a mobile prefix of a network at anytime.

Optionally, after step 604 in this embodiment, the method may further include: sending, by the MN, a home test initialization (HTI, Home Test Init) message to the HA-C, and forwarding, by the HA-C, the HTI message to the CN;

or sending, by the MN, an HTI message to the first HA-U, and forwarding, by the first HA-U, the HTI message to the CN. The MN sends the HTI message to the HA-C (or the first HA-U), and the HA-C (or the first HA-U) forwards the HTI to the CN, so that the MN can complete a related step of route optimization by interacting with the HA-C (or the first HA-U).

Figure 7:
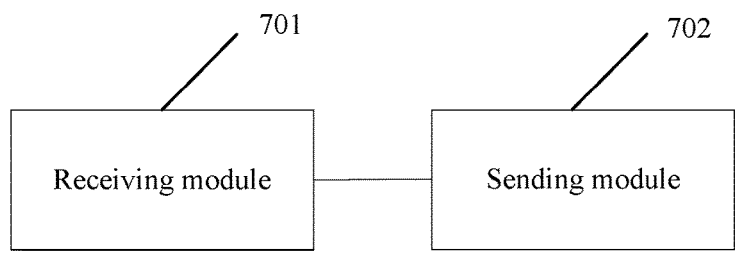
FIG. 7 is a schematic structural diagram of Embodiment 1 of a mobility management apparatus according to the present disclosure.

FIG. 7 is a schematic structural diagram of Embodiment 1 of a mobility management apparatus according to the present disclosure. The apparatus is an HA-C, and the apparatus is applied to a communications system. The communications system includes the HA-C, a first HA-U, and an MN, where the first HA-U is located in a first network, the first HA-U is deployed on a first proxy server or a gateway, and the HA-C is deployed on a second proxy server. As shown in FIG. 7, the apparatus in this embodiment may include a receiving module 701 and a sending module 702. The receiving module 701 is configured to receive a first BU message sent by the MN when the MN accesses the first network. The sending module 702 is configured to send a first BA message to the MN according to the first BU message, where the first BA message includes an address of the first HA-U, so that the MN performs tunnel communication with the first HA-U according to the address of the first HA-U after the MN moves from the first network to a second network. The receiving module 701 is further configured to receive a second BU message sent by the MN after the MN moves from the first network to the second network, where the second BU message includes a home address HoA and a care-of address CoA that are of the MN. The sending module 702 is further configured to send a configuration message to the first HA-U, where the configuration message includes the HoA and the CoA that are of the MN, so that the first HA-U performs tunnel communication with the MN according to the configuration message.

The apparatus in this embodiment may be configured to perform the technical solution in the method embodiment shown in FIG. 3. An implementation principle and a technical effect of the apparatus are similar to those in the method embodiment, and details are not described herein again.

Figure 8:
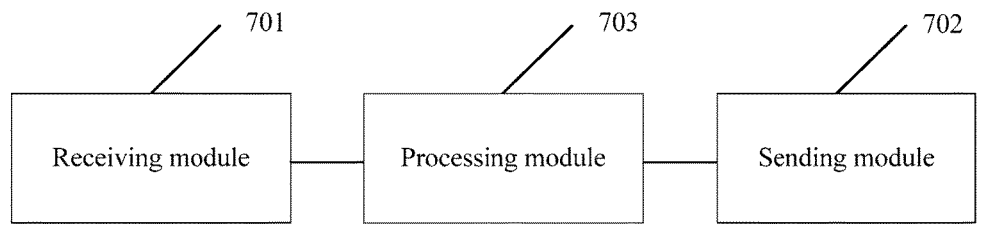
FIG. 8 is a schematic structural diagram of Embodiment 2 of a mobility management apparatus according to the present disclosure.

FIG. 8 is a schematic structural diagram of Embodiment 2 of a mobility management apparatus according to the present disclosure. As shown in FIG. 8, the apparatus in this embodiment is based on a structure of the apparatus shown in FIG. 7. Further, if the first network includes at least two HA-Us, and the at least two HA-Us are separately deployed on different proxy servers or different gateways, the apparatus may further include a processing module 703, and the processing module 703 is configured to determine, according to a load balance rule, the first HA-U from the at least two HA-Us included in the first network.

Optionally, the processing module 703 is specifically configured to determine an HA-U with minimum load in the at least two HA-Us included in the first network as the first HA-U.

Optionally, the first BU message includes the HoA of the MN. Correspondingly, the processing module 703 is further configured to: create a binding cache entry BCE for the MN, where the BCE includes the address of the first HA-U and the HoA; and update the BCE according to the CoA of the MN included in the second BU message, to obtain an updated BCE, where the updated BCE includes the address of the first HA-U, the HoA, and the CoA.

Optionally, the communications system may further include a second HA-U, and the second HA-U is located in the second network.

Correspondingly, the processing module 703 is further configured to determine, in the second network, the second HA-U for the MN. The sending module 702 is further configured to send a second BA message to the MN, where the second BA message includes an address of the second HA-U, so that the MN performs tunnel communication with the second HA-U according to the address of the second HA-U after the MN moves from the second network to a third network different from the second network.

Further, optionally, if the second network includes at least two HA-Us, and the at least two HA-Us are separately deployed on different proxy servers or different gateways, the processing module 703 is specifically configured to determine, according to the load balance rule, the second HA-U for the MN from the at least two HA-Us included in the second network.

Optionally, the configuration message may further include a tunnel type, and the tunnel type is used to indicate a tunnel protocol used when tunnel communication is performed. The first BA message may further include the tunnel type.

Further, optionally, the configuration message may further include a tunnel parameter, and the tunnel parameter is a related parameter used when tunnel communication is performed by using the tunnel protocol indicated by the tunnel type. The first BA message may further include the tunnel parameter.

Optionally, the receiving module 701 is further configured to receive an MPS message sent by the MN. The sending module 702 is further configured to return an MPA message to the MN.

Optionally, the communications system may further include a CN, and the CN communicates with the MN by using the first network. The receiving module 701 is further configured to receive an HTI message sent by the MN. The sending module 702 is further configured to forward the HTI message to the CN.

The apparatus in this embodiment may be configured to perform the technical solution on an HA-C side in the method embodiment shown in FIG. 6. An implementation principle and a technical effect of the apparatus are similar to those in the method embodiment, and details are not described herein again.

Figure 9:
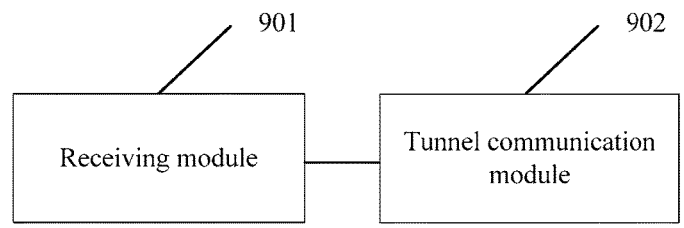
FIG. 9 is a schematic structural diagram of Embodiment 3 of a mobility management apparatus according to the present disclosure.

FIG. 9 is a schematic structural diagram of Embodiment 3 of a mobility management apparatus according to the present disclosure. The apparatus is a first HA-U, and the apparatus is applied to a communications system. The communications system includes a home agent control plane HA-C, the first HA-U, and a mobile node MN, where the first HA-U is located in a first network, the first HA-U is deployed on a first proxy server or a gateway, and the HA-C is deployed on a second proxy server. As shown in FIG. 9, the apparatus in this embodiment may include a receiving module 901 and a tunnel communication module 902. The receiving module 901 is configured to receive a configuration message sent by the HA-C, where the configuration message includes a home address HoA and a care-of address CoA that are of the MN. The tunnel communication module 902 is configured to perform tunnel communication with the MN according to the configuration message.

The apparatus in this embodiment may be configured to perform the technical solution in the method embodiment shown in FIG. 4. An implementation principle and a technical effect of the apparatus are similar to those in the method embodiment, and details are not described herein again.

Embodiment 4 of a Mobility Management Apparatus

Optionally, based on Embodiment 3 of the mobility management apparatus in the present disclosure, the communications system may further include a correspondent node CN, and the CN communicates with the MN by using the first network.

Correspondingly, the tunnel communication module 902 is specifically configured to: receive a first data packet sent by the MN, where the first data packet is a data packet obtained after the MN performs tunnel encapsulation on a second data packet according to an address of the first HA-U, and the second data packet is a data packet sent by the MN to the CN; and perform tunnel decapsulation on the first data packet to obtain the second data packet, and forward the second data packet to the CN.

Optionally, the tunnel communication module 902 is further configured to:

determine, according to the HoA of the MN included in a third data packet, that the third data packet is a data packet sent by the CN to the MN; and perform tunnel encapsulation on the third data packet according to the CoA of the MN to obtain a fourth data packet, and forward the fourth data packet to the MN, so that the MN performs tunnel decapsulation on the fourth data packet to obtain the third data packet.

Optionally, the configuration message may further include a tunnel type, and the tunnel type is used to indicate a tunnel protocol used when tunnel communication is performed.

Correspondingly, the tunnel communication module 902 is specifically configured to perform tunnel decapsulation on the first data packet according to the tunnel protocol corresponding to the tunnel type.

Further, optionally, the configuration message may further include a tunnel parameter, and the tunnel parameter is a related parameter used when tunnel communication is performed by using the tunnel protocol indicated by the tunnel type.

Correspondingly, the tunnel communication module 902 is specifically configured to perform tunnel decapsulation on the first data packet according to the tunnel parameter and the tunnel protocol corresponding to the tunnel type.

Optionally, the receiving module 901 is further configured to receive an MPS message sent by the MN. The apparatus further includes a first sending module, and the first sending module is configured to return an MPA message to the MN.

Optionally, the receiving module 901 is further configured to receive an HTI message sent by the MN. The apparatus further includes a second sending module, and the second sending module is configured to forward the HTI message to the CN.

The apparatus in this embodiment may be configured to perform the technical solution on a first HA-U side in the method embodiment shown in FIG. 6. An implementation principle and a technical effect of the apparatus are similar to those in the method embodiment, and details are not described herein again.

Figure 10:
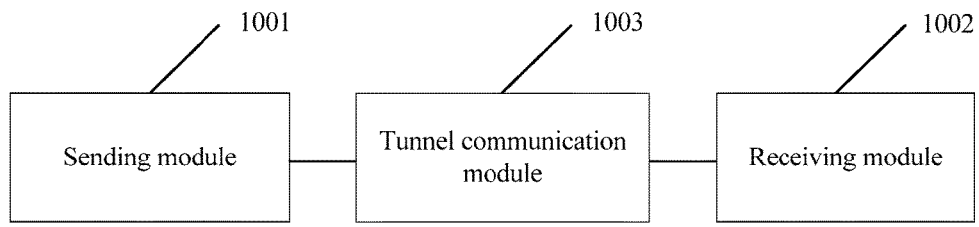
FIG. 10 is a schematic structural diagram of Embodiment 5 of a mobility management apparatus according to the present disclosure.

FIG. 10 is a schematic structural diagram of Embodiment 5 of a mobility management apparatus according to the present disclosure. The apparatus is an MN, and the apparatus is applied to a communications system. The communications system includes a home agent control plane HA-C, a first home agent user plane HA-U, and the MN, where the first HA-U is located in a first network, the first HA-U is deployed on a first proxy server or a gateway, and the HA-C is deployed on a second proxy server. As shown in FIG. 10, the apparatus in this embodiment may include a sending module 1001, a receiving module 1002, and a tunnel communication module 1003. The sending module 1001 is configured to send a first BU message to the HA-C when the MN accesses the first network. The receiving module 1002 is configured to receive a first BA message sent by the HA-C, where the first BA message includes an address of the first HA-U. The sending module 1001 is further configured to send a second BU message to the HA-C after the MN moves from the first network to a second network different from the first network, where the second BU message includes a home address HoA and a care-of address CoA that are of the MN, so that the HA-C sends the HoA and the CoA that are of the MN to the first HA-U by using a configuration message. The tunnel communication module 1003 is configured to perform tunnel communication with the first HA-U according to the address of the first HA-U.

The apparatus in this embodiment may be configured to perform the technical solution in the method embodiment shown in FIG. 5. An implementation principle and a technical effect of the apparatus are similar to those in the method embodiment, and details are not described herein again.

Embodiment 6 of a Mobility Management Apparatus

Optionally, based on Embodiment 5 of the mobility management apparatus in the present disclosure, the communications system further includes a second HA-U, and the second HA-U is located in the second network.

Correspondingly, the receiving module 1002 is further configured to receive a second BA message sent by the HA-C, where the second BA message includes an address of the second HA-U.

Optionally, if the MN moves from the second network to a third network different from the second network, the tunnel communication module 1003 is further configured to perform tunnel communication with the second HA-U according to the second BA message.

Optionally, the communications system further includes a CN, and the CN communicates with the MN by using the first network. The tunnel communication module 1003 is specifically configured to: perform tunnel encapsulation on a second data packet according to the address of the first HA-U to obtain a first data packet, and send the first data packet to the first HA-U, so that the first HA-U performs tunnel decapsulation on the first data packet to obtain the second data packet, and forwards the second data packet to the CN, where the second data packet is a data packet sent by the MN to the CN.

Optionally, the tunnel communication module 1003 is further configured to:

receive a fourth data packet sent by the first HA-U, where the fourth data packet is a data packet obtained after the first HA-U performs tunnel encapsulation on a third data packet according to the CoA of the MN, and the third data packet is a data packet sent by the CN to the MN; and perform tunnel decapsulation on the fourth data packet to obtain the third data packet.

Optionally, the first BA message further includes a tunnel type, and the tunnel type is used to indicate a tunnel protocol used when tunnel communication is performed.

Correspondingly, the tunnel communication module 1003 is specifically configured to perform tunnel encapsulation on the second data packet according to the address of the first HA-U and the tunnel protocol corresponding to the tunnel type.

Further, optionally, the first BA message further includes a tunnel parameter, and the tunnel parameter is a related parameter used when tunnel communication is performed by using the tunnel protocol indicated by the tunnel type.

Correspondingly, the tunnel communication module 1003 is specifically configured to perform tunnel encapsulation on the second data packet according to the address of the first HA-U, the tunnel parameter, and the tunnel protocol corresponding to the tunnel type.

Optionally, the sending module 1001 is further configured to send an MPS message to the HA-C.

The receiving module 1002 is further configured to receive an MPA message sent by the HA-C.

Optionally, the sending module 1001 is further configured to send an HTI message to the HA-C.

The apparatus in this embodiment may be configured to perform the technical solution on an MN side in the method embodiment shown in FIG. 6. An implementation principle and a technical effect of the apparatus are similar to those in the method embodiment, and details are not described herein again.

The present disclosure further provides a mobility management system, and the system is a communications system. The communications system includes the HA-C in Embodiment 1 or Embodiment 2 of the mobility management apparatus, the first HA-U in Embodiment 3 or Embodiment 4 of the mobility management apparatus, and the MN and the CN in Embodiment 5 or Embodiment 6 of the mobility management apparatus.

The system in this embodiment may be used to perform the technical solution in the method embodiment shown in FIG. 6. An implementation principle and a technical effect of the system are similar to those in the method embodiment, and details are not described herein again.

Figure 11:
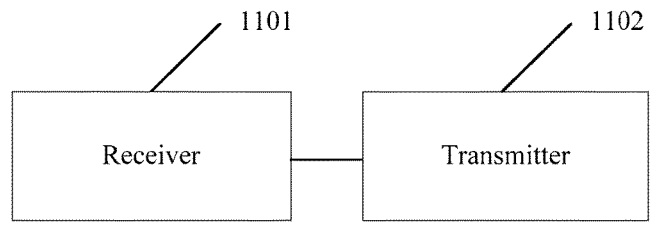
FIG. 11 is a schematic structural diagram of Embodiment 7 of a mobility management apparatus according to the present disclosure.

FIG. 11 is a schematic structural diagram of Embodiment 7 of a mobility management apparatus according to the present disclosure. The apparatus is an HA-C, and the apparatus is applied to a communications system. The communications system includes the HA-C, a first HA-U, and an MN, where the first HA-U is located in a first network, the first HA-U is deployed on a first proxy server or a gateway, and the HA-C is deployed on a second proxy server. As shown in FIG. 11, the apparatus in this embodiment may include a receiver 1101 and a transmitter 1102. The receiver 1101 is configured to receive a first BU message sent by the MN when the MN accesses the first network. The transmitter 1102 is configured to send a first BA message to the MN according to the first BU message, where the first BA message includes an address of the first HA-U, so that the MN performs tunnel communication with the first HA-U according to the address of the first HA-U after the MN moves from the first network to a second network. The receiver 1101 is further configured to receive a second BU message sent by the MN after the MN moves from the first network to the second network, where the second BU message includes a home address HoA and a care-of address CoA that are of the MN. The transmitter 1102 is further configured to send a configuration message to the first HA-U, where the configuration message includes the HoA and the CoA that are of the MN, so that the first HA-U performs tunnel communication with the MN according to the configuration message.

The apparatus in this embodiment may be configured to perform the technical solution in the method embodiment shown in FIG. 3. An implementation principle and a technical effect of the apparatus are similar to those in the method embodiment, and details are not described herein again.

Figure 12:
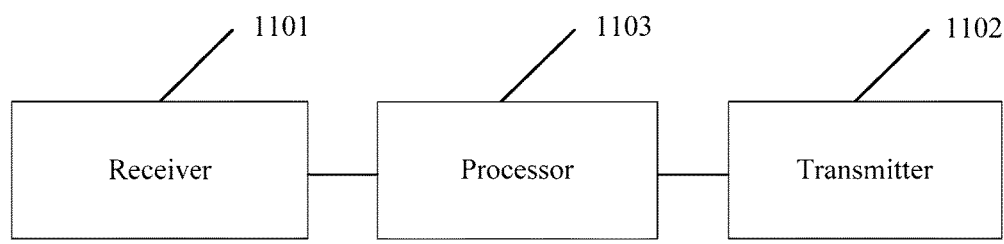
FIG. 12 is a schematic structural diagram of Embodiment 8 of a mobility management apparatus according to the present disclosure.

FIG. 12 is a schematic structural diagram of Embodiment 8 of a mobility management apparatus according to the present disclosure. As shown in FIG. 12, the apparatus in this embodiment is based on a structure of the apparatus shown in FIG. 11. Further, if the first network includes at least two HA-Us, and the at least two HA-Us are separately deployed on different proxy servers or different gateways, the apparatus may further include a processor 1103, and the processor 1103 is configured to determine, according to a load balance rule, the first HA-U from the at least two HA-Us included in the first network.

Optionally, the processor 1103 is specifically configured to determine an HA-U with minimum load in the at least two HA-Us included in the first network as the first HA-U.

Optionally, the first BU message includes the HoA of the MN. Correspondingly, the processor 1103 is further configured to: create a binding cache entry BCE for the MN, where the BCE includes the address of the first HA-U and the HoA; and update the BCE according to the CoA of the MN included in the second BU message, to obtain an updated BCE, where the updated BCE includes the address of the first HA-U, the HoA, and the CoA.

Optionally, the communications system may further include a second HA-U, and the second HA-U is located in the second network.

Correspondingly, the processor 1103 is further configured to determine, in the second network, the second HA-U for the MN. The transmitter 1102 is further configured to send a second BA message to the MN, where the second BA message includes an address of the second HA-U, so that the MN performs tunnel communication with the second HA-U according to the address of the second HA-U after the MN moves from the second network to a third network different from the second network.

Further, optionally, if the second network includes at least two HA-Us, and the at least two HA-Us are separately deployed on different proxy servers or different gateways, the processor 1103 is specifically configured to determine, according to the load balance rule, the second HA-U for the MN from the at least two HA-Us included in the second network.

Optionally, the configuration message may further include a tunnel type, and the tunnel type is used to indicate a tunnel protocol used when tunnel communication is performed. The first BA message may further include the tunnel type.

Further, optionally, the configuration message may further include a tunnel parameter, and the tunnel parameter is a related parameter used when tunnel communication is performed by using the tunnel protocol indicated by the tunnel type.

The first BA message may further include the tunnel parameter.

Optionally, the receiver 1101 is further configured to receive an MPS message sent by the MN. The transmitter 1102 is further configured to return an MPA message to the MN.

Optionally, the communications system may further include a CN, and the CN communicates with the MN by using the first network. The receiver 1101 is further configured to receive an HTI message sent by the MN. The transmitter 1102 is further configured to forward the HTI message to the CN.

The apparatus in this embodiment may be configured to perform the technical solution on an HA-C side in the method embodiment shown in FIG. 6. An implementation principle and a technical effect of the apparatus are similar to those in the method embodiment, and details are not described herein again.

Figure 13:
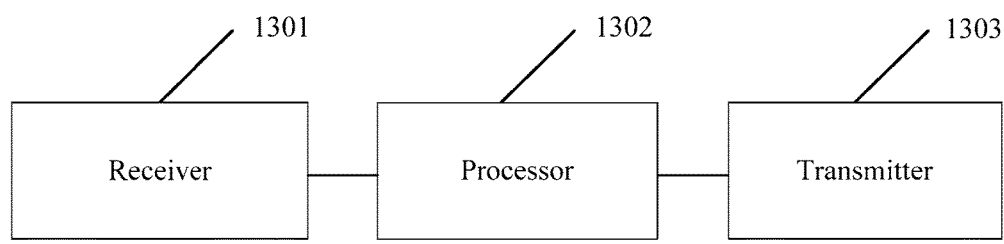
FIG. 13 is a schematic structural diagram of Embodiment 9 of a mobility management apparatus according to the present disclosure.

FIG. 13 is a schematic structural diagram of Embodiment 9 of a mobility management apparatus according to the present disclosure. The apparatus is a first HA-U, and the apparatus is applied to a communications system. The communications system includes a home agent control plane HA-C, the first HA-U, and a mobile node MN, where the first HA-U is located in a first network, the first HA-U is deployed on a first proxy server or a gateway, and the HA-C is deployed on a second proxy server. As shown in FIG. 13, the apparatus in this embodiment may include a receiver 1301 and a processor 1302. The receiver 1301 is configured to receive a configuration message sent by the HA-C, where the configuration message includes a home address HoA and a care-of address CoA that are of the MN. The processor 1302 is configured to perform tunnel communication with the MN according to the configuration message.

The apparatus in this embodiment may be configured to perform the technical solution in the method embodiment shown in FIG. 4. An implementation principle and a technical effect of the apparatus are similar to those in the method embodiment, and details are not described herein again.

Embodiment 10 of a Mobility Management Apparatus

Optionally, based on Embodiment 9 of the mobility management apparatus in the present disclosure, the communications system may further include a correspondent node CN, and the CN communicates with the MN by using the first network.

Correspondingly, the processor 1302 is specifically configured to: receive a first data packet sent by the MN, where the first data packet is a data packet obtained after the MN performs tunnel encapsulation on a second data packet according to an address of the first HA-U, and the second data packet is a data packet sent by the MN to the CN; and perform tunnel decapsulation on the first data packet to obtain the second data packet, and forward the second data packet to the CN.

Optionally, the processor 1302 is further configured to:

determine, according to the HoA of the MN included in a third data packet, that the third data packet is a data packet sent by the CN to the MN; and perform tunnel encapsulation on the third data packet according to the CoA of the MN to obtain a fourth data packet, and forward the fourth data packet to the MN, so that the MN performs tunnel decapsulation on the fourth data packet to obtain the third data packet.

Optionally, the configuration message may further include a tunnel type, and the tunnel type is used to indicate a tunnel protocol used when tunnel communication is performed.

Correspondingly, the processor 1302 is specifically configured to perform tunnel decapsulation on the first data packet according to the tunnel protocol corresponding to the tunnel type.

Further, optionally, the configuration message may further include a tunnel parameter, and the tunnel parameter is a related parameter used when tunnel communication is performed by using the tunnel protocol indicated by the tunnel type.

Correspondingly, the processor 1302 is specifically configured to perform tunnel decapsulation on the first data packet according to the tunnel parameter and the tunnel protocol corresponding to the tunnel type.

Optionally, the receiver 1301 is further configured to receive an MPS message sent by the MN. The apparatus further includes a transmitter 1303, and the transmitter is further configured to return an MPA message to the MN.

Optionally, the receiver 1301 is further configured to receive an HTI message sent by the MN; and the transmitter 1303 is further configured to forward the HTI message to the CN.

The apparatus in this embodiment may be configured to perform the technical solution on a first HA-U side in the method embodiment shown in FIG. 6. An implementation principle and a technical effect of the apparatus are similar to those in the method embodiment, and details are not described herein again.

Figure 14:
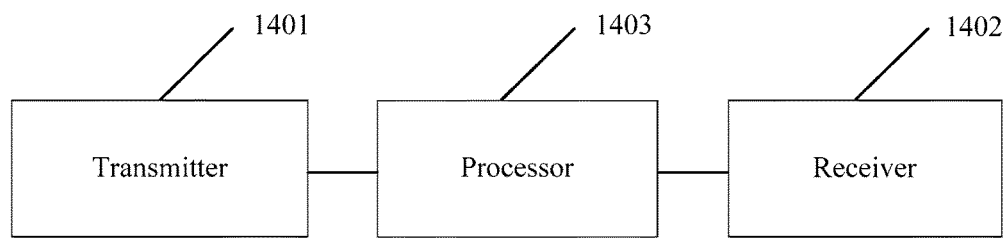
FIG. 14 is a schematic structural diagram of Embodiment 11 of a mobility management apparatus according to the present disclosure.

FIG. 14 is a schematic structural diagram of Embodiment 11 of a mobility management apparatus according to the present disclosure. The apparatus is an MN, and the apparatus is applied to a communications system. The communications system includes a home agent control plane HA-C, a first home agent user plane HA-U, and the MN, where the first HA-U is located in a first network, the first HA-U is deployed on a first proxy server or a gateway, and the HA-C is deployed on a second proxy server. As shown in FIG. 14, the apparatus in this embodiment may include a transmitter 1401, a receiver 1402, and a processor 1403. The transmitter 1401 is configured to send a first BU message to the HA-C when the MN accesses the first network. The receiver 1402 is configured to receive a first BA message sent by the HA-C, where the first BA message includes an address of the first HA-U. The transmitter 1401 is further configured to send a second BU message to the HA-C after the MN moves from the first network to a second network different from the first network, where the second BU message includes a home address HoA and a care-of address CoA that are of the MN, so that the HA-C sends the HoA and the CoA that are of the MN to the first HA-U by using a configuration message. The processor 1403 is configured to perform tunnel communication with the first HA-U according to the address of the first HA-U.

The apparatus in this embodiment may be configured to perform the technical solution in the method embodiment shown in FIG. 5. An implementation principle and a technical effect of the apparatus are similar to those in the method embodiment, and details are not described herein again.

Embodiment 12 of a Mobility Management Apparatus

Optionally, based on Embodiment 5 of the mobility management apparatus in the present disclosure, the communications system further includes a second HA-U, and the second HA-U is located in the second network.

Correspondingly, the receiver 1402 is further configured to receive a second BA message sent by the HA-C, where the second BA message includes an address of the second HA-U.

Optionally, if the MN moves from the second network to a third network different from the second network, the processor 1403 is further configured to perform tunnel communication with the second HA-U according to the second BA message.

Optionally, the communications system further includes a CN, and the CN communicates with the MN by using the first network. The processor 1403 is specifically configured to: perform tunnel encapsulation on a second data packet according to the address of the first HA-U to obtain a first data packet, and send the first data packet to the first HA-U, so that the first HA-U performs tunnel decapsulation on the first data packet to obtain the second data packet, and forwards the second data packet to the CN, where the second data packet is a data packet sent by the MN to the CN.

Optionally, the processor 1403 is further configured to:
receive a fourth data packet sent by the first HA-U, where the fourth data packet is a data packet obtained after the first HA-U performs tunnel encapsulation on a third data packet according to the CoA of the MN, and the third data packet is a data packet sent by the CN to the MN; and perform tunnel decapsulation on the fourth data packet to obtain the third data packet.

Optionally, the first BA message further includes a tunnel type, and the tunnel type is used to indicate a tunnel protocol used when tunnel communication is performed.

Correspondingly, the processor 1403 is specifically configured to perform tunnel encapsulation on the second data packet according to the address of the first HA-U and the tunnel protocol corresponding to the tunnel type.

Further, optionally, the first BA message further includes a tunnel parameter, and the tunnel parameter is a related parameter used when tunnel communication is performed by using the tunnel protocol indicated by the tunnel type.

Correspondingly, the processor 1403 is specifically configured to perform tunnel encapsulation on the second data packet according to the address of the first HA-U, the tunnel parameter, and the tunnel protocol corresponding to the tunnel type.

Optionally, the transmitter 1401 is further configured to send an MPS message to the HA-C.

The receiver 1402 is further configured to receive an MPA message sent by the HA-C.

Optionally, the transmitter 1401 is further configured to send an HTI message to the HA-C.

The apparatus in this embodiment may be configured to perform the technical solution on an MN side in the method embodiment shown in FIG. 6. An implementation principle and a technical effect of the apparatus are similar to those in the method embodiment, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A mobility management apparatus, configured as a home agent control plane (HA-C), for use in a communications system comprising the HA-C, a first home agent user plane (HA-U), and a mobile node (MN), wherein the first HA-U is deployed on a first proxy server or a gateway located in a first network and the HA-C is deployed on a second proxy server, the apparatus comprising:
a receiver, configured to:
receive a first binding update (BU) message sent by the MN when the MN accesses the first network, and
receive a second BU message sent by the MN after the MN moves from the first network to a second network, wherein the second BU message comprises a home address (HoA) and a care-of address (CoA) of the MN;
a transmitter, configured to:
send a first binding acknowledgement (BA) message to the MN according to the first BU message, wherein the first BA message comprises an address of the first HA-U, and
send a configuration message to the first HA-U, wherein the configuration message comprises the HoA and the CoA of the MN; and
wherein when the first network comprises at least two HA-Us, and the at least two HA-Us are separately deployed on different proxy servers or different gateways, the apparatus further comprises:
a processor, configured to determine, according to a load balance rule, the first HA-U from the at least two HA-Us comprised in the first network.

2. The apparatus according to claim 1, wherein the processor is configured to determine an HA-U with minimum load in the at least two HA-Us comprised in the first network as the first HA-U.

3. The apparatus according to claim 1, wherein the first BU message comprises the HoA of the MN, and the processor is further configured to:
create a binding cache entry (BCE) for the MN, wherein the BCE comprises the address of the first HA-U and the HoA; and
update the BCE according to the CoA of the MN comprised in the second BU message, to obtain an updated BCE, wherein the updated BCE comprises the address of the first HA-U, the HoA, and the CoA.

4. The apparatus according to claim 1, wherein:
the communications system further comprises a second HA-U located in the second network;
the processor is further configured to determine, in the second network, the second HA-U for the MN; and
the transmitter is further configured to send a second BA message to the MN, wherein the second BA message comprises an address of the second HA U.

5. The apparatus according to claim 4, wherein when the second network comprises at least two HA-Us, and the at least two HA-Us are separately deployed on different proxy servers or different gateways, the processor is configured to:
determine, according to the load balance rule, the second HA-U for the MN from the at least two HA-Us comprised in the second network.

6. The apparatus according to claim 1, wherein the configuration message further comprises:
a tunnel type for indicating a tunnel protocol used when tunnel communication is performed, and wherein the first BA message further comprises the tunnel type; or
a tunnel parameter used when tunnel communication is performed by using the tunnel protocol indicated by the tunnel type, and wherein the first BA message further comprises the tunnel parameter.

7. A mobility management apparatus, configured as a home agent control plane (HA-C), for use in a communications system comprising the HA-C, a first home agent user plane (HA-U), and a mobile node (MN), wherein the first HA-U is deployed on a first proxy server or a gateway located in a first network and the HA-C is deployed on a second proxy server, the apparatus comprising:
a receiver, configured to:
receive a first binding update (BU) message sent by the MN when the MN accesses the first network,
receive a second BU message sent by the MN after the MN moves from the first network to a second network, wherein the second BU message comprises a home address (HoA) and a care-of address (CoA) of the MN, and
receive a mobile prefix solicitation (MPS) message sent by the MN; and
a transmitter, configured to:
send a first binding acknowledgement (BA) message to the MN according to the first BU message, wherein the first BA message comprises an address of the first HA-U,
send a configuration message to the first HA-U, wherein the configuration message comprises the HoA and the CoA of the MN, and
return a mobile prefix advertisement (MPA) message to the MN.

8. A mobility management apparatus, configured as a home agent control plane (HA-C), for use in a communications system comprising the HA-C, a first home agent user plane (HA-U), and a mobile node (MN), wherein the first HA-U is deployed on a first proxy server or a gateway located in a first network and the HA-C is deployed on a second proxy server, the apparatus comprising:
a receiver, configured to:
receive a first binding update (BU) message sent by the MN when the MN accesses the first network, and
receive a second BU message sent by the MN after the MN moves from the first network to a second network, wherein the second BU message comprises a home address (HoA) and a care-of address (CoA) of the MN;
a transmitter, configured to:
send a first binding acknowledgement (BA) message to the MN according to the first BU message, wherein the first BA message comprises an address of the first HA-U, and
send a configuration message to the first HA-U, wherein the configuration message comprises the HoA and the CoA of the MN; wherein:
the communications system further comprises a correspondent node (CN) for communicating with the MN using the first network;
the receiver is further configured to receive a home test initialization (HTI) message sent by the MN; and
the transmitter is further configured to forward the HTI message to the CN.

9. A mobility management apparatus configured as a first home agent user plane (HA-U) for use in in a communications system comprising a home agent control plane (HA-C), the first HA-U, a mobile node (MN), and a correspondent node (CN), wherein the first HA-U is deployed on a first proxy server or a gateway in a first network, the HA-C is deployed on a second proxy server, and the CN is configured for communicating with the MN using the first network, the apparatus comprising:
a receiver, configured to receive a configuration message sent by the HA-C, wherein the configuration message comprises a home address (HoA) and a care-of address (CoA) of the MN; and
a processor, configured to:
perform tunnel communication with the MN according to the configuration message,
receive a first data packet sent by the MN, wherein the first data packet is a data packet obtained after the MN performs tunnel encapsulation on a second data packet according to an address of the first HA-U, and the second data packet is a data packet sent by the MN to the CN, and
perform tunnel decapsulation on the first data packet to obtain the second data packet, and forward the second data packet to the CN.

10. The apparatus according to claim 9, wherein the processor is further configured to:
determine, according to the HoA of the MN comprised in a third data packet, that the third data packet is a data packet sent by the CN to the MN; and
perform tunnel encapsulation on the third data packet according to the CoA of the MN to obtain a fourth data packet, and forward the fourth data packet to the MN.

11. The apparatus according to claim 9, wherein:
the configuration message further comprises a tunnel type for indicating a tunnel protocol used when tunnel communication is performed; and
the processor is configured to perform tunnel decapsulation on the first data packet according to the tunnel protocol corresponding to the tunnel type.

12. The apparatus according to claim 11, wherein:
the configuration message further comprises a tunnel parameter used when tunnel communication is performed by using the tunnel protocol indicated by the tunnel type; and
the processor is configured to perform tunnel decapsulation on the first data packet according to the tunnel parameter and the tunnel protocol corresponding to the tunnel type.

13. A mobility management apparatus configured as a first home agent user plane (HA-U) for use in in a communications system comprising a home agent control plane (HA-C), the first HA-U, and a mobile node (MN), wherein the first HA-U is deployed on a first proxy server or a gateway in a first network, and the HA-C is deployed on a second proxy server, the apparatus comprising:
a receiver, configured to:
receive a configuration message sent by the HA-C, wherein the configuration message comprises a home address (HoA) and a care-of address (CoA) of the MN, and
receive a mobile prefix solicitation (MPS) message sent by the MN;
a processor, configured to perform tunnel communication with the MN according to the configuration message; and
a transmitter, configured to return a mobile prefix advertisement (MPA) message to the MN.

14. A mobility management apparatus configured as a first home agent user plane (HA-U) for use in in a communications system comprising a home agent control plane (HA-C), the first HA-U, and a mobile node (MN), wherein the first HA-U is deployed on a first proxy server or a gateway in a first network, and the HA-C is deployed on a second proxy server, the apparatus comprising:
- a receiver, configured to:
  - receive a configuration message sent by the HA-C, wherein the configuration message comprises a home address (HoA) and a care-of address (CoA) of the MN, and
  - receive a home test initialization (HTI) message sent by the MN;
- a correspondent node (CN) for communicating with the MN using the first network;
- a processor, configured to perform tunnel communication with the MN according to the configuration message; and
- a transmitter, configured to forward the HTI message to the CN.

15. A mobility management apparatus configured as a mobile node (MN) for use in a communications system comprising a home agent control plane (HA-C), a first home agent user plane (HA-U), and the MN, and wherein the first HA-U is deployed on a first proxy server or a gateway in a first network, and the HA-C is deployed on a second proxy server, the apparatus comprising:
- a transmitter, configured to:
  - send a first binding update (BU) message to the HA-C when the MN accesses the first network,
  - send a second BU message to the HA-C after the MN moves from the first network to a second network different from the first network, wherein the second BU message comprises a home address (HoA) and a care-of address (CoA) of the MN;
- a receiver, configured to receive a first binding acknowledgement (BA) message sent by the HA-C, wherein the first BA message comprises an address of the first HA-U;
- a processor, configured to perform tunnel communication with the first HA-U according to the address of the first HA-U;
- wherein the communications system further comprises a second HA-U located in the second network; and
- wherein the receiver is further configured to receive a second BA message sent by the HA-C, wherein the second BA message comprises an address of the second HA-U.

16. The apparatus according to claim 15, wherein when the MN moves from the second network to a third network different from the second network, the processor is further configured to perform tunnel communication with the second HA-U according to the second BA message.

17. A mobility management apparatus configured as a mobile node (MN) for use in a communications system comprising a home agent control plane (HA-C), a first home agent user plane (HA-U), a correspondent node (CN), and the MN, and wherein the first HA-U is deployed on a first proxy server or a gateway in a first network, the HA-C is deployed on a second proxy server, and the CN is configured for communicating with the MN using the first network, the apparatus comprising:
- a transmitter, configured to:
  - send a first binding update (BU) message to the HA-C when the MN accesses the first network,
  - send a second BU message to the HA-C after the MN moves from the first network to a second network different from the first network, wherein the second BU message comprises a home address (HoA) and a care-of address (CoA) of the MN;
- a receiver, configured to receive a first binding acknowledgement (BA) message sent by the HA-C, wherein the first BA message comprises an address of the first HA-U; and
- a processor, configured to:
  - perform tunnel communication with the first HA-U according to the address of the first HA-U,
  - perform tunnel encapsulation on a second data packet according to the address of the first HA-U to obtain a first data packet, and
  - send the first data packet to the first HA-U, so that the first HA-U performs tunnel decapsulation on the first data packet to obtain the second data packet, and forwards the second data packet to the CN, wherein the second data packet is a data packet sent by the MN to the CN.

18. A mobility management apparatus configured as a mobile node (MN) for use in a communications system comprising a home agent control plane (HA-C), a first home agent user plane (HA-U), and the MN, and wherein the first HA-U is deployed on a first proxy server or a gateway in a first network, and the HA-C is deployed on a second proxy server, the apparatus comprising:
- a transmitter, configured to:
  - send a first binding update (BU) message to the HA-C when the MN accesses the first network,
  - send a second BU message to the HA-C after the MN moves from the first network to a second network different from the first network, wherein the second BU message comprises a home address (HoA) and a care-of address (CoA) of the MN, and
  - send a mobile prefix solicitation (MPS) message to the HA-C;
- a receiver, configured to:
  - receive a first binding acknowledgement (BA) message sent by the HA-C, wherein the first BA message comprises an address of the first HA-U, and
  - receive a mobile prefix advertisement (MPA) message sent by the HA-C; and
- a processor, configured to perform tunnel communication with the first HA-U according to the address of the first HA-U.

19. A mobility management apparatus configured as a mobile node (MN) for use in a communications system comprising a home agent control plane (HA-C), a first home agent user plane (HA-U), and the MN, and wherein the first HA-U is deployed on a first proxy server or a gateway in a first network, and the HA-C is deployed on a second proxy server, the apparatus comprising:
- a transmitter, configured to:
  - send a first binding update (BU) message to the HA-C when the MN accesses the first network,
  - send a second BU message to the HA-C after the MN moves from the first network to a second network different from the first network, wherein the second BU message comprises a home address (HoA) and a care-of address (CoA) of the MN, and
  - send a home test initialization (HTI) message to the HA-C;
- a receiver, configured to receive a first binding acknowledgement (BA) message sent by the HA-C, wherein the first BA message comprises an address of the first HA-U; and
- a processor, configured to perform tunnel communication with the first HA-U according to the address of the first HA-U.

* * * * *